A. E. SPINASSE.
GLASS DRAWING PROCESS.
APPLICATION FILED OCT. 22, 1908.

915,899.

Patented Mar. 23, 1909.

UNITED STATES PATENT OFFICE.

ARTHUR E. SPINASSE, OF MOUNT VERNON, OHIO, ASSIGNOR OF ONE-FOURTH TO HERBERT C. WOOD, OF MOUNT VERNON, OHIO.

GLASS-DRAWING PROCESS.

No. 915,899.

Specification of Letters Patent.

Patented March 23, 1909.

Application filed October 22, 1908. Serial No. 458,961.

*To all whom it may concern:*

Be it known that I, ARTHUR E. SPINASSE, a citizen of the United States, residing at Mount Vernon, county of Knox, and State of Ohio, have invented certain new and useful Improvements in Glass-Drawing Processes, of which I declare the following to be a full, clear, and exact description.

This invention relates to improvements in drawing hollow glass articles or cylinders from the mass of molten glass, and has among its objects to provide an improved method or process therefor which will reduce to a minimum the difficulties connected with the use of baits for such drawing operation, and the troubles experienced in raising the desired cylinder of glass.

Figure 1:
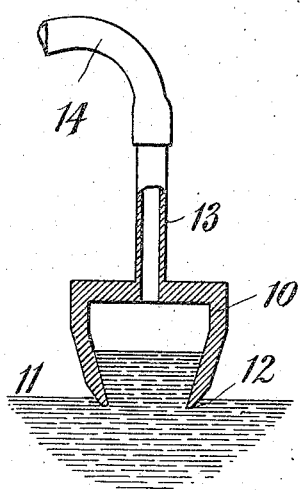
Figure 2:
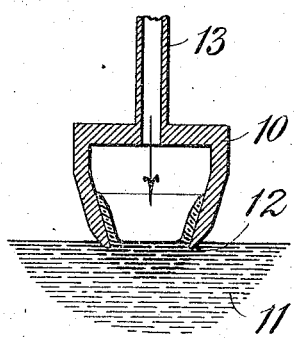
Figure 3:
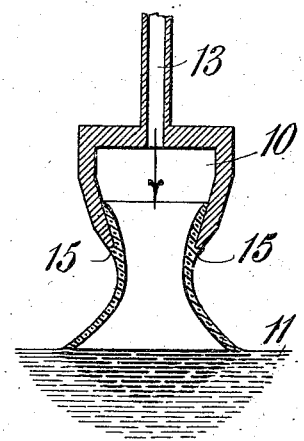

This process or method is illustrated in diagrammatic Figures 1, 2, and 3 of the drawings attached hereto and forming part of this specification.

The form of bait shown and described herein in connection with this improved method is likewise shown and described in a copending application of the same applicant, Serial No. 458,858, filed on October 21, 1908. Said bait itself forms the subject of claims in said other application, while in the present patent it is desired to claim the improved method or process referred to.

This method consists of the following steps:—First, the hollow bait 10 (Fig. 1) is lowered so that its lower periphery or edge just comes in contact with the surface of the molten glass 11 which may be contained as usual in any desired form of receptacle. This bait is in the form of a tubular chamber, the diameter of which decreases toward its lower end as plainly shown in the drawings. The lower edge 12 of the bait, where the bait comes in contact with the surface of the glass, is thinned down to be of less thickness than the upper portion of the walls of the bait. A tube or pipe 13 leads into the interior chamber of the bait, and by means of a tube 14 attached thereto, the fluid or gaseous pressure within the interior chamber of the bait may be diminished or increased at will, said tube 14 being attached to suitable well-known apparatus for that purpose. Having lowered the bait into contact with the glass, as shown in Fig. 1, the second step of the process consists in exhausting the air or decreasing the pressure within the bait in such manner as to cause a solid column of glass to rise into the interior chamber, as shown in Fig. 1. Then this condition of pressure is maintained to hold this column of glass elevated for sufficient duration to permit slight cooling of the glass and its adhering to the inner wall of the bait. Then the unbalanced pressure may be released or the pressure restored to initial atmospheric pressure, or additional pressure may be introduced within the chamber to cause the expelling of the center core of this glass column downward into the main body of the molten glass. This, however, will result in leaving the slightly cooled portion adhering to the wall of the bait in the shape of the ring shown in Fig. 2. This ring forms the initial portion of the glass cylinder so that the bait may now be raised for the purpose of drawing the remainder of the cylinder as a continuation of this initially formed ring. In order, however, to give more body to the glass at this point, this improved method may be carried further by increasing the pressure within the bait as the bait is raised from the surface of the glass, so as thereby to form the lower part of the said ring into a shoulder 15 engaging the lower edge of said bait. This will afford further support for the glass cylinder in the continued upward drawing movement of the bait. The further increase of pressure within the chamber then permits the glass cylinder to be blown into any desired shape.

It will be understood that various forms of baits may be used and various forms of gases may be utilized in connection with producing the variations of pressure within the interior chamber of the bait and in blowing the glass cylinder, all of these various forms coming within the scope of the claims which follow.

The operator in using this process may regulate the pressures by means of suitable valve and gage devices so as to enable him to raise the column of glass to the proper height and to maintain this column elevated any desired duration of time. The thickness of the said initial ring may of course be varied by varying the length of time during which the column of glass is held elevated. The column raised within the bait being somewhat away from the mass of glass will lose some of its plasticity according to the length of time it is so held there, and moreover by this process the glass is prevented from cooling too fast. This method also has numerous advantages over any system in which the bait must be inserted within the molten mass, because such bait would then have to be withdrawn quickly for fear of marring the glass by the melting of the bait, thus enabling only a thin coating of glass to be attached to the bait. Furthermore, the column of plastic glass within the bait does not become solid or chilled within the bait, but is easily forced out by the blowing process, that is, the increase of pressure. When the suction is released and the center core of the column goes down, this provides an opening for the compressed air to force its way into the interior of the cylinder or hollow article to be drawn. Then when the bait is raised and the slightly more plastic column of glass is returned downward to the mass, the continued pressure will serve to blow the shoulders referred to for the drawing of the cylinder. This prevents, to a certain extent, the usual thinning down of the glass wall at this point as it is blown wider.

What is claimed is as follows:

1. The method of drawing hollow glass articles, consisting of first lowering a hollow bait into contact with the surface of the molten glass, decreasing the fluid pressure within the bait to draw up a solid column of glass within the bait, maintaining this column elevated for sufficient duration to permit slight cooling and adhering of the glass to the inner wall of the bait, and then increasing the internal fluid pressure on said column to expel the central core thereof and leave a ring of glass on said inner wall and extending upward from the surface of the molten glass.

2. The method of drawing hollow glass cylinders, consisting of first lowering a hollow bait into contact with the surface of the molten glass, decreasing the fluid pressure within the bait to draw up a solid column of glass within the bait, maintaining this column elevated for sufficient duration to permit slight cooling and adhering of the glass to the inner wall of the bait, increasing the internal fluid pressure on said column to expel the central core thereof and leave a ring of glass on said inner wall and extending upward from the surface of the molten glass, and then raising the bait and further increasing the interior pressure to form the lower part of said ring into a shoulder engaging the lower edge of said bait for the further support of the glass cylinder in the continued upward drawing movement of the bait.

In testimony whereof I affix my signature in the presence of two witnesses.

ARTHUR E. SPINASSE.

Witnesses:
HERBERT C. WOOD.
W. C. ROCKWELL.